United States Patent [19]
Hajj et al.

[11] Patent Number: 5,657,143
[45] Date of Patent: Aug. 12, 1997

[54] OPTICAL TRANSMISSION SYSTEM SUITABLE FOR VIDEO-COMMUNICATION CABLE NETWORKS

[75] Inventors: Mohamed Hajj, Le Vesinet; Yves Cretin, Vaucresson, both of France

[73] Assignee: Alcatel Cit, Paris, France

[21] Appl. No.: 563,438

[22] Filed: Nov. 24, 1995

Related U.S. Application Data

[63] Continuation of Ser. No. 152,671, Nov. 16, 1993, abandoned.

[30] Foreign Application Priority Data

Nov. 17, 1992 [FR] France ............... 92 13782

[51] Int. Cl.⁶ ............................................. H04J 14/02
[52] U.S. Cl. ............................................. 359/124; 359/161
[58] Field of Search ............................ 359/124, 134, 359/154, 161, 173, 180, 181

[56] References Cited

U.S. PATENT DOCUMENTS

| | | | |
|---|---|---|---|
| 4,560,246 | 12/1985 | Cotter | 359/173 |
| 4,726,011 | 2/1988 | Ih et al. | 359/127 |
| 4,778,238 | 10/1988 | Hicks | 359/134 |
| 5,184,244 | 2/1993 | Nishimura et al. | 359/189 |
| 5,200,964 | 4/1993 | Huber | 372/26 |
| 5,315,426 | 5/1994 | Aoki | 359/180 |
| 5,329,396 | 7/1994 | Fishman et al. | 359/173 |

FOREIGN PATENT DOCUMENTS 050483  9/1992  European Pat. Off. ........ H04B 10/18

OTHER PUBLICATIONS

Journal of Lightwave Technology, vol. 9, No. 9, Sep. 1991, New York, US, pp. 1145–1155, T. Sugie: "Transmission Limitations of CPFSK Coherent Lightwave Systems Due to Stimulated Brillouin Scattering in Optical Fiber".

IEEE Photonics Technology Letters vol. 4, No. 3, Mar. 1992, New York, US, pp. 287–289, X.P. Mao et al.: "Brillouin Scattering in Externally Modulated Lightwave AM–VSB CATV Transmission Systems".

*Primary Examiner*—Wellington Chin
*Assistant Examiner*—Rafael Bacares
*Attorney, Agent, or Firm*—Sughrue, Mion, Zinn, Macpeak & Seas

[57] ABSTRACT

A system for transmission on an optical link by modulating an optical carrier suitable for video-communication cable networks, includes devices for increasing the modulation of the optical carrier, such as increasing the intensity modulation. The system is particularly suited for the case in which a high input optical power is coupled into the optical link. Also, the modulation can be increased from a null value if the modulation is other than intensity modulation, in order to prevent or to reduce phenomena degrading transmission quality associated with the Brillouin effect.

15 Claims, 2 Drawing Sheets

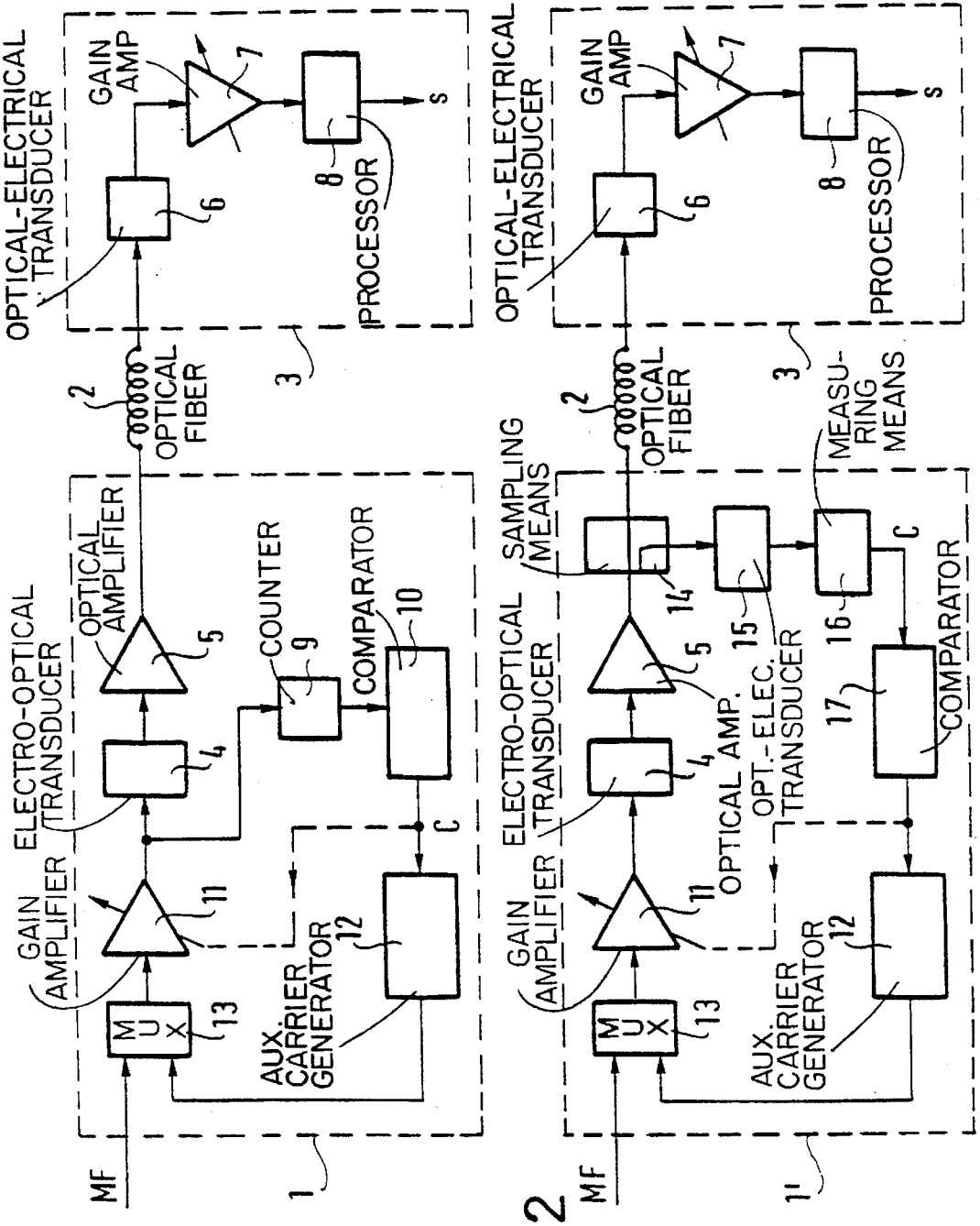

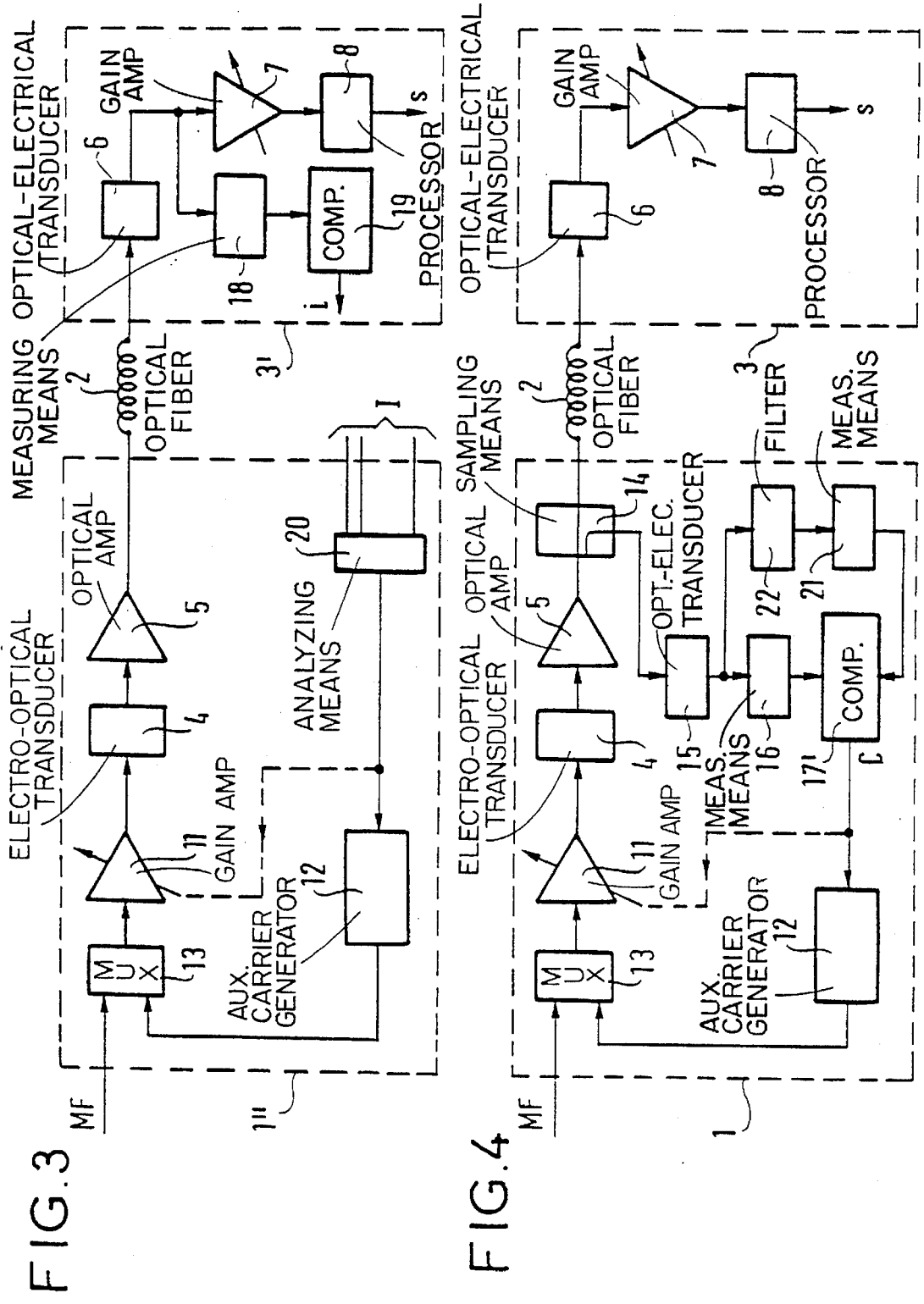

OPTICAL TRANSMISSION SYSTEM SUITABLE FOR VIDEO-COMMUNICATION CABLE NETWORKS

This is a Continuation of application Ser. No. 08/152,671 filed Nov. 16, 1993, now abandoned.

BACKGROUND OF THE INVENTION

The present invention concerns the transmission of information on an optical link.

The present invention is more particularly concerned with a system for transmitting analog information or digital data on an optical link when a high input optical power is to be coupled into said link because optical amplification means are used at the sending end of the link, for example.

Thus the present invention applies inter alia to point-to-multipoint transmission networks, such as videocommunication cable networks, for example, enabling television programs to be distributed from a central station (head end) to a set of remote stations.

Coupling a high input optical power into an optical fiber link raises a technical problem which is related to the Brillouin effect. The problem is that if this optical power reaches a particular threshold called the Brillouin threshold, which is dependent on the fiber specification and the length of the link, reflections occur when this optical power is coupled into the fiber which lead to deterioration of transmission quality within the transmission system reflected in the occurrence of attenuation, distortion and further disruption of the signals transmitted.

SUMMARY OF THE INVENTION

An object of the present invention is to provide a solution to this problem.

The present invention is based on the applicant's observation that the Brillouin threshold is in direct proportion to the degree of modulation of the intensity of the optical carrier, or in other words the intensity modulation index or intensity modulation degree.

The present invention consists in a system for transmission on an optical link by modulating an optical carrier suitable for videocommunication cable networks characterized in that, in the case of a high input optical power to be coupled into said optical link in particular, it comprises means for increasing the intensity modulation index of the optical carrier, if necessary, optionally from a null value if said modulation transmitting analog information or digital data is modulation other than intensity modulation, in order to prevent or to reduce phenomena degrading transmission quality associated with the Brillouin effect.

Other objects and features of the present invention will emerge from the following description of embodiments of the invention given by way of example in the case of the application mentioned above to videocommunication cable networks, said description being given with reference to the appended drawings in which:

BRIEF DESCRIPTION OF THE DRAWINGS

FIG. 1 shows a first embodiment of a transmission system in accordance with the invention, FIG. 2 shows a second embodiment of a transmission system in accordance with the invention, FIG. 3 shows a third embodiment of a transmission system in accordance with the invention, FIG. 4 shows a fourth embodiment of a transmission system in accordance with the invention.

DESCRIPTION OF THE PREFERRED EMBODIMENTS

In the application example used here of a videocommunication cable network, the intensity of the optical carrier is modulated by a modulating signal which is a frequency multiplex comprising a plurality of so-called active carriers modulated by respective different television signals to be broadcast simultaneously over the network (in this example using vestigial side band amplitude modulation). Here, modulating the intensity of the optical carrier refers to varying the amplitude of the optical carrier and thereby varying the power of the optical carrier.

In this application example a transmission system between the central station and a remote station of the network comprises, as shown in FIG. 1:

a send end equipment 1 located in the central station, an optical fiber link 2, a receive end equipment 3 located in the remote station.

The send end equipment 1 receives an incoming frequency multiplex MF comprising n active carriers where n is an integer less than or equal to N where N denotes the maximum number of active carriers which can be transmitted over the network.

The send end equipment 1 comprises an electro-optical transducer 4 which receives the incoming frequency multiplex MF when the latter has been processed in a manner to be described later and which supplies an optical signal comprising an optical carrier the intensity of which is modulated by the processed frequency multiplex. It further comprises an optical amplifier 5 which receives the optical signal from the electro-optical transducer 4 and which supplies the optical signal to be coupled into the optical fiber 2.

The receive end equipment 3 comprises an optical-electrical transducer 6 whose input is coupled to the optical link 2 and which outputs an electrical signal corresponding to said frequency multiplex, a variable gain amplifier 7 to compensate for any mismatch between the gain of the send optical amplifier 5 and the length of the optical link 2 connecting the central station of the network to this remote station, and a processor 8 for extracting from the received multiplex a specific television signal s selected by this remote station.

Because the optical amplifier 5 is used at the sending end of the link the optical power to be coupled into the fiber 2 is relatively high. Depending on the relative magnitudes of this optical power and the Brillouin effect threshold power, the above-mentioned phenomena which degrade transmission quality on the network may occur.

The applicant has observed that these phenomena occur in this application when the number of active carriers of the incoming frequency multiplex is insufficient, including when the network is first put into service (when the active carriers are commissioned progressively) or because of a temporary reduction in the number of television programs broadcast over the network (overnight, in particular).

The applicant has also observed that when the number n of active carriers reaches or exceeds a particular limiting value n0, or more generally when the modulation of the optical carrier reaches or exceeds a particular limiting value, these phenomena disappear. The particular limiting value, n0, relates to the Brillouin effect, depends on specific characteristics of the transmission system, such as the optical fiber length.

According to the invention, the incoming frequency multiplex is therefore processed, as mentioned above, this processing becoming operative on detection on the condition n<no, or any other equivalent condition, and consisting (for example) in the addition to said multiplex of one or more auxiliary carriers or in amplification of said multiplex, the required result being in all cases an increase in the modulation of the optical carrier.

To this end, the send end equipment 1 in the FIG. 1 embodiment comprises:

means for detecting if the number n of active carriers of the incoming frequency multiplex is less than said predetermined limiting value no, means for increasing the intensity modulation index of the optical carrier in response to such detection so as to prevent or at least reduce phenomena degrading the quality of transmission associated with the Brillouin effect.

The means for detecting if the number n of active carriers of the incoming frequency multiplex is less than the predetermined limiting value no comprise (for example) a counter 9 for counting the number n of active carriers of the incoming multiplex and a comparator 10 for comparing this value n to the limiting value no.

For example, and with reference to the embodiment shown in FIG. 1, this comparator is an integral part of a microprocessor that is already present, together with the counter 9, in a videocommunication cable network of this kind, for implementing network management tasks. In this instance the microprocessor is adapted to produce a specific instruction C which is active if the value n is found to be less than the value no.

The means for increasing the intensity modulation index of the optical carrier in response to this may comprise (for example) a variable gain amplifier 11 which receives the incoming multiplex and whose gain is commanded by the instruction C.

As an alternative to this, the means for increasing the intensity modulation index of the optical carrier in this case may comprise means for adding one or more auxiliary carriers to the incoming multiplex, these means comprising in the example shown in FIG. 1 an auxiliary carrier generator 12 and a multiplexer 13 receiving the incoming multiplex and said auxiliary carrier.

The means for increasing the intensity modulation index of the optical carrier may equally well comprise in combination a variable gain amplifier like the amplifier 11, an auxiliary carrier generator like the generator 12 and a multiplexer like the multiplexer 13.

To indicate these various options for implementing said means for increasing the intensity modulation index of the optical carrier, FIG. 1 shows in dashed line the control of the gain of the amplifier 11 by the instruction C, the amplifier 11 itself possibly being present in any event to provide automatic gain control in order to compensate for any variations in the level of the incoming multiplex.

Note that implementing said means for increasing the intensity modulation index of the optical carrier by adding one or more auxiliary carriers to the incoming multiplex rather than by amplifying the multiplex can have the advantage of circumventing potential problems associated with non-linearities of the amplifier which amplifies the incoming multiplex.

Note also that the auxiliary carrier(s) are advantageously such that they and the intermodulation products of them and the active carriers lie outside the frequency channels occupied by all of the modulated active carriers that can be transmitted over the network.

The send end equipment 1' of the transmission system shown in FIG. 2 comprises, for detecting if the intensity modulation index of the optical carrier is below a predetermined limiting value:

means 14 for sampling a part, advantageously a small part, of the optical power available at the output of the optical amplifier 5, an optical-electrical transducer 15 receiving the optical power sampled by the sampling means 14, means 16 for measuring a characteristic magnitude (such as the mean value, the rms value or the peak value) of the electrical signal output by the optical-electrical transducer 15, a comparator 17 for comparing the value measured by the measuring means 16 with a predetermined limiting value.

As stated for FIG. 1, the comparator 17 may be an integral part of a microprocessor used in the send end equipment of the network, in which case the microprocessor is adapted to produce a specific instruction C which is active if said measured value is found to be less than said predetermined value and is used to increase the intensity modulation index of the optical carrier to prevent or at least to reduce the phenomena degrading transmission quality related to the Brillouin effect.

The other components of the send end equipment 1' of the transmission system shown in FIG. 2 are similar to those of the send end equipment 1 of the transmission system shown in FIG. 1 and are identified by the same reference numbers: electro-optical transducer 4, optical amplifier 5, variable gain amplifier 11, auxiliary carrier generator 12 and multiplexer 13. As in FIG. 1, the components 11 and 12 are controlled by the instruction C.

The transmission system shown in FIG. 2 further comprises an optical link and a receive end equipment similar to those 2 and 3 of the transmission system shown in FIG. 1 and identified by the same reference numbers, the receive end equipment 3 in turn comprising components similar to those of the receive end equipment from FIG. 1 identified by the same reference numbers: optical-electrical transducer 6, variable gain amplifier 7 and processor 8.

The receive end equipment 3' of the transmission system shown in FIG. 3 comprises, for detecting if the modulation of the optical carrier is less than a predetermined limiting value:

means 18 for measuring a characteristic magnitude (such as the mean value, the rms value or the peak value) of the electrical signal from the optical-electrical transducer 6, a comparator 19 for comparing the value measured by the measuring means 18 and a predetermined limiting value.

The comparator 19 may also be an integral part of a microprocessor already present in this receive end equipment of the network for implementing network management tasks.

In this application to a point-multipoint broadcast network the microprocessor supplies a specific indication "i" that said measured value is less than said predetermined value.

The indication "i" from the comparator 19 is routed to the send end equipment 1" over a backward channel which may comprise the same optical link 2, for example, if this link is bidirectional or a separate optical or non-optical link, which may use the public switched telephone network, for example.

In this application to a point-multipoint broadcast network the various indications "i" relating to the various receive end equipments of the network, generically denoted I, are received in the receive end equipment by means 20 for analyzing these various indications in order to determine whether at least one of them indicates that for the respective receive end equipment said measured value is less than said predetermined value, in which case the analyzer means 20 produce an active instruction C which is used to increase the modulation of the optical carrier to prevent or at least to reduce the phenomena degrading transmission quality associated with the Brillouin effect.

Like the comparator 17 of the send end equipment 1' of FIG. 2, the analyzer means 20 may be an integral part of a microprocessor already present in this send end equipment for implementing network management tasks.

The other components of the receive end equipment of the transmission system shown in FIG. 3 are similar to those of the receive end equipment of the transmission system shown in FIGS. 1 and 2 and are identified by the same reference numbers: optical-electrical transducer 6, variable gain amplifier 7 and processor 8.

The transmission system shown in FIG. 3 further comprises an optical link similar to that 2 of the transmission system shown in FIG. 1 and a send end equipment 1" comprising components similar to those of the send end equipment 1 shown in FIG. 1 and identified by the same reference numbers: electro-optical transducer 4, optical amplifier 5, variable gain amplifier 11, auxiliary carrier generator 12 and multiplexer 13. The components 11 and 12 are controlled by the instruction C.

Said predetermined values, number of active carriers of the multiplex modulating the optical carrier, characteristic magnitude of the signal representing this multiplex (measured at the send or receive end) or more generally the degree of intensity modulation of the optical carrier, are determined experimentally, for example, by varying the parameter in question and observing the spectrum of the received signal in order to note the specific value of this parameter for which the received signal is the least degraded.

For example, for a maximum number N of active carriers in the order of 30 to 40 and for an optical carrier intensity modulation index in the order of 5%, expressed conventionally in this application for each carrier of the multiplex modulating said optical carrier, the number no would be in the order of 8 to 10 for an optical link over a distance in the order of 15 km between the send end equipment and the remotest receive end equipment.

The variable gain amplifier 7 of the receive end equipment is advantageously used to achieve automatic gain control at the receiving end to guard against variations in the intensity modulation index of the optical carrier in accordance with the present invention.

A transmission system in accordance with the invention advantageously further comprises means for reducing the intensity modulation index of the optical carrier, if necessary, after it has been increased as described above.

In this application to a point-to-multipoint broadcast network, for example, if the number of active carriers of the incoming frequency multiplex assumes or returns to a value that is sufficient for the phenomena degrading transmission quality associated with the Brillouin effect no longer to occur, amplification of the signal modulating the optical carrier or adding one or more auxiliary carriers is no longer justified and may even cause transmission quality to deteriorate through the occurrence of intermodulation products due to overmodulation of the optical carrier and to non-linearity of components such as the amplifier 11, the electrical-optical transducer 4 and the optical amplifier 5.

In the embodiment shown in FIG. 1 said means for reducing the intensity modulation index of the optical carrier, if necessary, after this has been increased may be implemented in the same manner as the means for increasing the intensity modulation index, if necessary, as described with reference to FIG. 1, but operating in the converse way, i.e. when the number of active carriers of the incoming multiplex (counted by the counter 9) is detected to be greater than the predetermined limiting value no by the comparator 10, the instruction C becomes active to reduce the gain of the amplifier 11 and/or to eliminate the auxiliary carrier(s) through the intermediary of the components 12 and 13.

With reference to the embodiment shown in FIG. 2, in practise the information supplied by the measuring means 16, which can be used as described to detect if the number n of active carriers of the incoming frequency multiplex is less than a predetermined limiting value no, cannot be used to detect if the number n is greater than no, the value measured by the measuring means 16 remaining substantially constant when n increases from a value equal to no.

In this case, to detect if it is necessary to reduce the intensity modulation index of the optical carrier, if it has been increased, it would be possible (for example) to reduce progressively, as appropriate, the amplitude of the auxiliary carrier generated by the generator 12 and/or the gain of the amplifier 11, observing each time if the information at the output of the comparator 17 still indicates that the value measured by the measuring means 16 is greater than the predetermined limiting value in question (given that if this is not the case this progressive reduction process is stopped), this process continuing until complete extinction of the auxiliary carrier and/or reduction of the gain of the amplifier 11 cancelling out entirely its earlier increase.

Referring to FIG. 2, the means for reducing, if necessary, the intensity modulation index of the optical carrier could be implemented in substantially the same manner as the means described above for increasing the intensity modulation index, if necessary, subject to actual, rather than optional replacement of the comparator 17 with a microprocessor adapted to implement the above-described sequence of progressively reducing the amplitude of the auxiliary carrier generated by the generator 12 and/or the gain of the amplifier 11.

With reference to the FIG. 3 embodiment, said means for reducing the intensity modulation index of the optical carrier, if necessary, after it has been increased could be similar to those described above for the FIG. 2 embodiment, subject to actual, rather than optional replacement of the analyzer means 20 with a microprocessor adapted further to implement the sequence of progressive reduction of the amplitude of the auxiliary carrier generated by the generator 12 and/or the gain of the amplifier 11, said microprocessor taking due account at each stage of said progressive reduction sequence of all of the indications "i" obtained from the various receive end equipments of the network, and said progressive reduction sequence either being continued to completion provided that all of these indications "i" authorize this or interrupted if at least one of these indications "i" requires it.

Another embodiment of said means for reducing the intensity modulation index of the optical carrier, if necessary, after it has been increased is described next with reference to FIG. 4, by way of example and in the case of a transmission system of the type shown in FIG. 2.

The FIG. 4 embodiment detects if it is necessary to reduce the intensity modulation index of the optical carrier, when this has been increased, by using measuring means 21 to measure a characteristic magnitude of the signal at the output of a filter 22 for selecting a predetermined intermodulation product from the spectrum of the signal at the output of the optical-electrical transducer 15.

If the result of this measurement exceeds a tolerable limiting value, which is detected by a comparator (or a microprocessor) 17' implementing the functions of the comparator 17, this comparator (or microprocessor) outputs an instruction (also denoted C in the case where this instruction can assume either of two opposite states) which when active reduces the intensity modulation index of the optical carrier by means of the components 11 and/or 12, 13 in such a way that the result of said measurement becomes again less than said tolerable limiting value.

The transmission system shown in FIG. 4 comprises, in addition to the components 17', 21 and 22 already described, other components similar to those already described with reference to the transmission system shown in FIG. 2 and identified by the same reference numbers, namely 4, 5, 6, 7, 8, 11, 12, 13, 15, 16.

For example, the intermodulation product may be a combination such as (f1p+f2p) or (f1p−f2p) of two pilot frequencies f1p and f2p transmitted over the network at all times, rather than a combination of two active carriers which may disappear if the television programs transmitted on these carriers are interrupted. These pilot frequencies, fed into the network through the multiplexer 13, for example, are conventionally employed by variable gain amplifiers like the amplifier 7 in preference to the frequency multiplex formed by the modulated active carriers to carry out the automatic gain control mentioned above. This is because these unmodulated pilot frequencies are at a fixed level whereas the level of the frequency multiplex formed from the modulated active carriers varies continuously with the information transmitted.

The pilot frequencies are usually chosen so that one is below the band occupied by the frequency multiplex formed by the set of modulated active carriers and the other is above this band so that said automatic gain control can be effected across all of this band.

If only one pilot frequency, the frequency f1p, for example, is provided to detect if it is necessary to reduce the intensity modulation index of the optical carrier, after it has been increased, a harmonic of the pilot frequency would be used, for example the second harmonic 2f1p.

If no pilot frequency is provided an intermodulation product is used resulting from beating between active carriers, for example. The beat frequency is preferably high in order to minimize the risk of disappearance of the intermodulation product in the event of disappearance of the active carriers associated with interruption of the programs transmitted on these carriers.

Although the present invention has been specifically described in the context of its application to videocommunication cable networks, the invention is not limited to any such application. Depending on the type of application considered, and in the absence of any standards to the contrary, other solutions could be envisaged to increasing the modulation of the optical carrier, for example increasing the intensity modulation index of the signal modulating the optical carrier if this signal is itself an amplitude modulated signal.

Similarly, the invention would be equally applicable in the case of a signal modulating the optical carrier that is not subject to variations likely to reduce temporarily the intensity modulation index of the optical carrier but which is at all times such that the intensity modulation index would be insufficient to avoid or reduce the phenomena degrading transmission quality associated with the Brillouin effect.

The invention is also applicable to a transmission system in which the optical carrier modulated by the signal conveying the information to be transmitted is not intensity modulated but rather frequency or phase modulated, this type of modulation being also known as constant envelope or constant optical intensity modulation.

Given the same conditions as those described previously for intensity modulation, i.e. in the case where the Brillouin effect degrades the quality of the received signals, intensity modulation is then applied in addition to said frequency or phase modulation and the resulting intensity modulation index rate is increased, if necessary, in order to push down the Brillouin threshold.

The signal intensity modulating the optical carrier can then be any signal (for example, a signal at a frequency outside the spectrum of the signal conveying the information to be transmitted).

To demonstrate what is common to these various applications, it may be said that the intensity modulation index of the optical carrier is, in accordance with the invention, increased, if necessary, possibly from a null value in the case where the optical carrier is modulated by modulation other than intensity modulation by the signal conveying the information to be transmitted.

What is claimed is:

1. A system having a sending end and a receiving end, for transmission on an optical link, comprising:

an electro-optical transducer for supplying an optical carrier modulated with at least one modulation signal, the electro-optical transducer comprising means for modulating the intensity of the optical carrier with at least one modulation signal;

means for applying the modulated carrier to the optical link; and means for controlling an intensity modulation index of the modulated carrier so that said intensity modulation index is greater than a limiting value, wherein the limiting value is a fixed value greater than or equal to the value at which the Brillouin effect occurs.

2. The system according to claim 1, wherein said limiting value is a value equal to a value at which the Brillouin effect occurs.

3. The system according to claim 1 characterized in that said means for, controlling said intensity modulation index comprises:

detection means for detecting a decrease in the intensity modulation index of the optical carrier; and means for increasing said index in response to such detection.

4. The system according to claim 3 characterized in that said detection means detects if the intensity modulation index of the optical carrier falls below a predetermined limit value less than that at which the Brillouin effect occurs.

5. The system according to claim 1 characterized in that said means for controlling the intensity modulation index of the optical carrier comprises means for amplifying the signal modulating said optical carrier.

6. The system according to claim 1 characterized in that a first modulation signal modulating said optical carrier being itself a frequency multiplex comprising a plurality of active carriers modulated by respective different signals conveying different information to be transmitted simultaneously over said system, said means for controlling the intensity modulation index of the optical carrier comprises means for adding one or more auxiliary carriers to said multiplex.

7. The system according to claim 6 characterized in that said one or more auxiliary carriers are such that they and the intermodulation products of them and the active carriers fall outside the frequency channels occupied by the modulated active carriers that are transmitted over the network.

8. The system according to claim 4 characterized in that said detection means comprises:

means for measuring a magnitude characteristic of all the modulation signals modulating the intensity of said optical carrier; and means for comparing the result of a measurement supplied by said measuring means with a predetermined value below which the Brillouin effect occurs, and for activating said means for increasing said intensity modulation index if said measurement is lower than said predetermined value.

9. The system according to claim 8, comprising at the receiving end an optical-electrical transducer means for outputting a signal corresponding to all the modulation signals modulating the intensity of said optical carrier, characterized in that said measuring means operates on the signal output by said optical-electrical transducer means, and transmits a signal to the sending end for activating said means for increasing said index, if said measurement is lower than said predetermined value.

10. The system according to claim 8, characterized in that said measuring means comprises, at the sending end:

means for sampling a part of the modulated optical carrier at the output of said electro-optical transducer; and optical-electrical transducer means for receiving the sampled modulated optical carrier and for outputting a signal corresponding to all the modulation signals modulating the intensity of the optical carrier.

11. The system according to claim 4 characterized in that the modulation signal modulating said optical carrier is a frequency multiplex comprising a plurality of active carriers modulated respectively by different signals conveying different information to be transmitted simultaneously over said system, said detector means comprises:

means for counting the number of active carriers of said multiplex; and means for comparing the result of said count with a predetermined limiting value below which the Brillouin effect occurs.

12. The system according to claim 1 characterized in that means for controlling comprises:

means for reducing the intensity modulation index of the optical carrier after it has been increased.

13. The system according to claim 12 characterized in that, the modulation signal modulating said optical carrier is a frequency multiplex comprising a plurality of active carriers modulated respectively by different signals conveying different information to be transmitted simultaneously over said system, said means for reducing the intensity modulation index of the optical carrier after it has been increased, comprises:

means for counting the number of active carriers of said multiplex;

means for comparing the result of said count with a predetermined limiting value below which the Brillouin effect occurs; and means for reducing the intensity modulation index of the optical carrier when said comparator means that the result of said count becomes less than said predetermined limiting value.

14. The system according to claim 12 characterized in that said means for reducing the intensity modulation index of the optical carrier after it has been increased comprises:

means for measuring a magnitude characteristic of all the modulation signals modulating the intensity of said optical carrier, means for comparing the result of said measurement with a predetermined limiting value below which the Brillouin effect occurs; and means for progressively reducing the intensity modulation index of the optical carrier and for detecting each time if said means for comparing indicates the result of said measurement is greater than said predetermined limiting value, in which case said progressive reduction is continued until completed, said progressive reduction being stopped otherwise.

15. The system according to claim 12 characterized in that said means for reducing the intensity modulation index of the optical carrier after it has been increased comprises:

means for measuring a magnitude of a characteristic of the signal corresponding to one of an intermodulation product and a harmonic selected by filter means in the spectrum of the signal modulating the optical carrier;

means for detecting if the result of said measurement is greater than a tolerable limiting value; and means for reducing the intensity modulation index of the optical carrier if the result of said measurement becomes greater than said tolerable limiting value.

* * * * *